(12) United States Patent
Miskin et al.

(10) Patent No.: US 7,451,856 B2
(45) Date of Patent: Nov. 18, 2008

(54) GRAVITY PRESSURIZED BRAKING SYSTEM

(75) Inventors: Mark Miskin, P.O. Box 218, Ucon, ID (US) 83454; Richard L. Sanders, Ucon, ID (US)

(73) Assignee: Mark Miskin, Ucon, ID (US)

( * ) Notice: Subject to any disclaimer, the term of this patent is extended or adjusted under 35 U.S.C. 154(b) by 0 days.

(21) Appl. No.: 11/032,736

(22) Filed: Jan. 10, 2005

(65) Prior Publication Data

US 2006/0151258 A1 Jul. 13, 2006

(51) Int. Cl.
*B60T 1/14* (2006.01)
*B60T 7/12* (2006.01)
*B60T 13/04* (2006.01)

(52) U.S. Cl. ............................. 188/5; 188/129; 188/176

(58) Field of Classification Search ............. 188/112 R, 188/129, 130, 174, 175, 176, 168, 119, 120–123, 188/177, 178; 303/22.2
See application file for complete search history.

(56) References Cited

U.S. PATENT DOCUMENTS

| | | | |
|---|---|---|---|
| 151,719 A * | 6/1874 | Schoubersky ............... 188/175 |
| 242,226 A * | 5/1881 | Schrabetz ................... 188/174 |
| 685,240 A * | 10/1901 | Schumacher ............... 188/176 |
| 1,301,290 A * | 4/1919 | Mead ........................ 188/174 |
| 1,311,998 A | 8/1919 | Rogers |
| 1,990,101 A | 2/1935 | Smith |
| 2,049,357 A | 7/1936 | Daignault |
| 2,050,468 A * | 8/1936 | Shipman .................... 280/421 |
| 2,064,026 A * | 12/1936 | Moneymaker .......... 188/112 R |
| 2,490,941 A * | 12/1949 | Bell et al. .................... 188/105 |
| 2,554,235 A * | 5/1951 | Bell et al. ...................... 91/509 |
| 2,555,184 A * | 5/1951 | Butler ........................ 244/111 |
| 2,687,191 A | 8/1954 | Shannon |
| 2,703,632 A | 3/1955 | Gambardella |
| 2,729,309 A * | 1/1956 | Mullin ................... 188/112 R |
| 2,824,713 A * | 2/1958 | Kelley ........................ 244/111 |
| 3,103,754 A * | 9/1963 | Ernst .......................... 188/176 |
| 3,664,465 A * | 5/1972 | Holland ....................... 188/10 |
| 3,994,369 A | 11/1976 | Powaska |
| 4,736,991 A | 4/1988 | Czarnowski |
| 4,792,192 A | 12/1988 | Tveitane |
| 5,029,947 A * | 7/1991 | Knight et al. .................. 303/7 |
| 5,573,312 A | 11/1996 | Muller et al. |
| 6,135,580 A | 10/2000 | Denning |
| 6,401,876 B1 | 6/2002 | Boros |
| 6,527,348 B2 * | 3/2003 | Jensen ................... 303/122.04 |
| 6,659,571 B2 | 12/2003 | Herrmann |
| 7,168,245 B2 * | 1/2007 | Thunes ........................ 60/403 |

* cited by examiner

*Primary Examiner*—Thomas J Williams
(74) *Attorney, Agent, or Firm*—Morriss O'Bryant Compagni (57) ABSTRACT

The present invention relates generally to hydraulic systems for actuating a vehicle braking system. More specifically, the present invention relates to a hydraulic system that uses the gravity-generated pressure in a load-bearing hydraulic cylinder to provide hydraulic pressure to a parking brake, emergency brakes, or service brake when properly modulated or other service. The present invention further relates to a system to reduce through dissipation or utilization the available gravity-generated hydraulic pressure so as to deploy a ground engaging drag-brake of a vehicle.

16 Claims, 5 Drawing Sheets

GRAVITY PRESSURIZED BRAKING SYSTEM

TECHNICAL FIELD

The present invention relates generally to hydraulic systems for actuating a vehicle braking system. More specifically, the present invention relates to a hydraulic system that uses the gravity-generated pressure in a load-bearing hydraulic cylinder to provide hydraulic pressure to a parking brake, emergency brakes, or service brake when properly modulated or other service. The present invention further relates to a system to reduce through dissipation or utilization the available gravity-generated hydraulic pressure so as to deploy a ground engaging drag-brake of a vehicle.

BACKGROUND

Many mobile devices have braking systems to aid in stopping the device when it is moving. Braking systems typically apply friction to rotating wheels or axles to inhibit further rotation. Other braking systems generate friction by engaging the ground. See e.g. U.S. Pat. Nos. 1,311,998, 1,990,101, 2,049,357, 2,687,191, 2,703,632, 3,994,369, and 6,401,876, which are hereby incorporated by reference. Typical braking systems for modern, powered, wheeled devices use hydraulic pressure to actuate a service brake mechanism.

Representative examples of hydraulic braking systems include, without limitation, the braking systems disclosed in U.S. Pat. Nos. 3,945,685 3,945,691, 3,946,642, 4,736,991 and 4,792,192, which are hereby incorporated by reference. A typical hydraulic braking system has a source of hydraulic pressure that is operatively connected to hydraulically actuated service brakes via hydraulic lines. The hydraulic braking system is typically operated by a foot pedal, the actuation of which allows hydraulic pressure to actuate the service brakes. However, a loss of hydraulic pressure can lead to brake failure and, subsequently, a run-away device, typically a vehicle.

To prevent run-away vehicles, backup hydraulic systems have been used. U.S. Pat. Nos. 4,736,991 and 4,792,192, which are hereby incorporated by reference, disclose some such systems. However, for various reasons, these backup systems require the presence of extra pressurized tanks for the storage of reserve hydraulic pressure. The extra space requirements for such tanks can make them unsuitable for vehicles where space is at a premium or where the vehicle is used in conditions or in a manner where puncture of a reserve tank could occur. Furthermore, such tanks are limited in the number of actuations they can provide and may become depleted due to seepage or leaks. Moreover, such systems typically lose all pressure when disconnected from the hydraulic supply. Lastly, such extra tanks and the associated hydraulic lines and valves, etc. may significantly increase the cost of such vehicles.

Other known braking systems include ground engaging braking systems. Some of these systems are hydraulically powered (e.g. U.S. Pat. Nos. 2,049,357, 2,687,191, 3,994, 369, and 6,401,876); while others are mechanically engaged (e.g. U.S. Pat. Nos. 1,311,998, 1,990,101, and 2,703,632). However, these vehicles are either also reliant on hydraulic pressure or, the case of mechanically engaged brakes, may provide insufficient mechanical advantage to quickly stop a heavy or fast moving vehicle.

An improved braking system that uses available non-reserve tank hydraulic pressure would be an improvement. Such a system that deployed a ground engaging brake upon utilization of that stored hydraulic pressure would be a further improvement.

SUMMARY

A braking system which uses a unique hydraulic system for providing a supply of hydraulic pressure to service brakes is disclosed. The hydraulic system includes a hydraulic fluid supply, a load-bearing hydraulic cylinder structure adapted for lifting an imposed weight, a first valve for controlling the flow of hydraulic fluid from the hydraulic fluid supply to the load-bearing hydraulic cylinder and a second valve for selectively controlling the flow of hydraulic fluid from the load-bearing hydraulic cylinder lifting the weight to a service brake system.

A system by which a ground engaging member is deployed is further disclosed. The hydraulic system utilizes the gravity-generated pressure in a load-bearing hydraulic cylinder lifting an imposed weight such that when the pressure has been sufficiently diminished through utilization or dissipation, the load-bearing hydraulic cylinder can no longer support the imposed weight. Thus, the imposed weight then descends under the force of gravity and the imposed weight or a structure attached thereto engages the ground, acting as a drag-brake.

A method for stopping a moving vehicle is also disclosed. Gravity-generated pressure in a load-bearing hydraulic cylinder is used to activate a service brake that is part of a wheel assembly. The gravity-generated pressure in the load-bearing hydraulic cylinder may be utilized or dissipated until the resistance is lowered and a ground engaging member, such as a drag brake, is deployed.

An earth moving or ground leveling apparatus is further disclosed. The earth moving or ground leveling apparatus may include a frame having opposing sides that is supported by at least two ground engaging wheels. The earth moving or ground leveling apparatus may also include a bucket having a floor, a pair of side walls, a rear wall, an apron for holding soil in the bucket, and a service brake system for arresting the rotation of the ground engaging wheels. The earth moving or ground leveling apparatus further includes a hydraulic system for actuating the wheel-associated braking system and for positioning the wheels supporting the frame such that the frame can be raised or lowered. The hydraulic system includes a first valve for controlling the flow of hydraulic fluid directly to the service brake system, a second valve for controlling height of the frame, and a third valve for diverting the gravity-generated hydraulic pressure imparted by the lifting of the frame from a load-bearing hydraulic cylinder to the service brake system.

A further earth moving or ground leveling apparatus is disclosed comprising a fourth valve for releasing the gravity-generated hydraulic pressure or diverting it to another useful function. The release or diversion of the gravity-generated hydraulic pressure from the braking system may result in the gravity-generated hydraulic pressure in the load-bearing hydraulic cylinder becoming diminished. Once sufficient gravity-generated hydraulic pressure is eliminated, the frame will descend to engage the ground and to act as a drag-brake.

DESCRIPTION OF THE DRAWINGS

It will be appreciated by those of ordinary skill in the art that the elements depicted in the various drawings are not to scale, but are for illustrative purposes only. The nature of the present invention, as well as other embodiments of the present invention may be more clearly understood by reference to the following detailed description of the invention, to the appended claims, and to the several drawings attached hereto.

DETAILED DESCRIPTION

The present invention relates generally to hydraulic systems for actuating a service braking system, especially one for a heavy-duty vehicle. More specifically, the present invention relates to a hydraulic system that uses the gravity-generated pressure from a load-bearing hydraulic cylinder to provide hydraulic pressure to a hydraulic service brake system associated with a wheel. The present invention further relates a system to utilize or dissipate the gravity-generated hydraulic pressure so as to deploy a ground engaging drag-brake.

It will be apparent to those of ordinary skill in the art that the embodiments described herein, while illustrative, are not intended to so limit the invention or the scope of the appended claims. Those of ordinary skill will understand that various combinations or modifications of the embodiments presented herein may be made without departing from the scope of the present invention.

Figure 1:
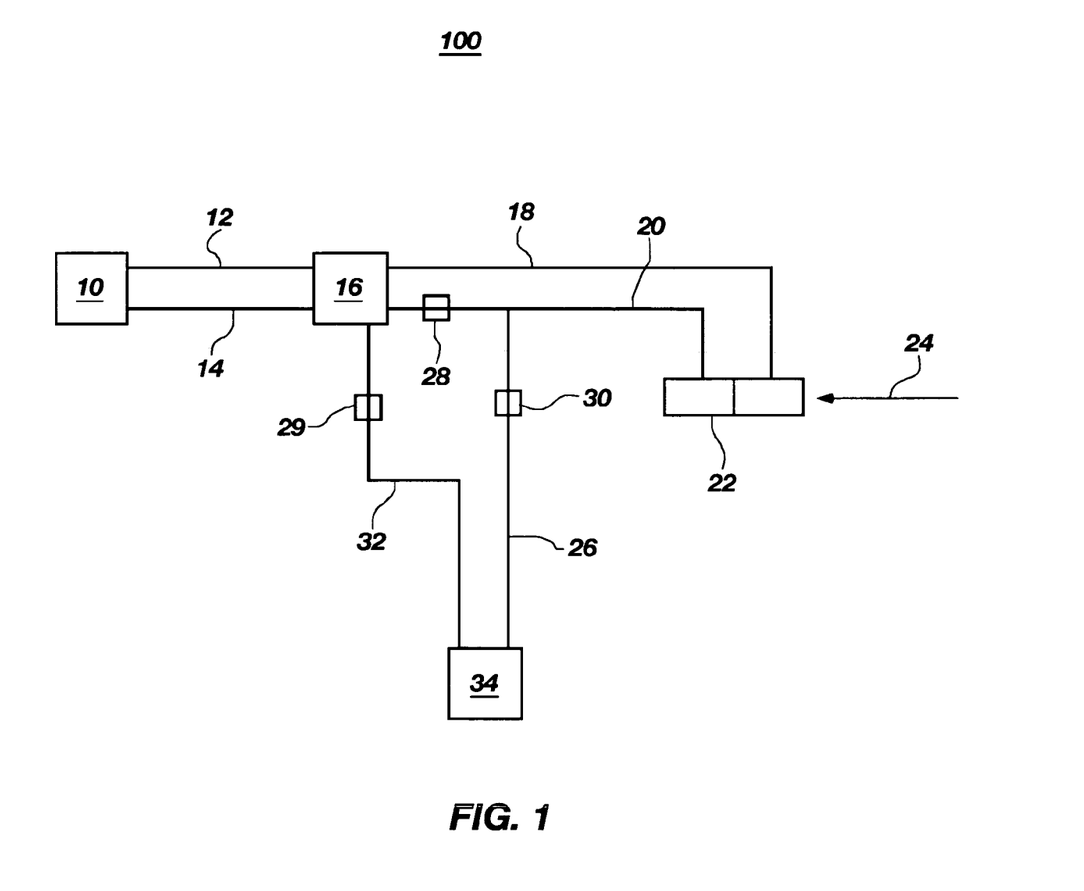
FIG. 1 is a schematic diagram of a hydraulic system used to provide hydraulic pressure to a brake system.

Referring now to drawing FIG. 1, there is illustrated a schematic view of a hydraulic system according to the present invention generally at 100. As illustrated, the hydraulic system 100 includes a load-bearing hydraulic cylinder 22 that is used in part to lift some imposed structural weight off of the ground. As used herein, an imposed weight is any weight that is in addition to or beyond the inherent weight of the piston in the hydraulic cylinder. For example, in an earth moving scraper, the load-bearing hydraulic cylinder 22 could lift an imposed weight comprising the frame of the scraper, a bucket for retaining soil, or, in a dumping trailer embodiment, load-bearing hydraulic cylinder 22 could be used to lift a dump bed. The load-bearing hydraulic cylinder 22 typically consists of a piston rod moving in a sleeve, such as the piston rod 82 depicted in FIG. 4, wherein the pressurized movement of hydraulic fluid into and out from the sleeve corresponds to the extension and retraction of the piston rod. Arrow 24 indicates the direction of the gravitational force acting on the weight-suspending load-bearing hydraulic cylinder 22. The load-bearing hydraulic cylinder 22 is operatively connected to a selector valve 16 through a pair of hydraulic lines 18 and 20. As will be appreciated by one of skill in the art, selector valve 16 may be associated only with hydraulic cylinder 22 or may be associated with other hydraulic cylinders such as those imparting movement to the apron or bucket of an earth moving scraper. A wheel-associated, hydraulic service brake system 34 is operatively connected to selector valve 16 through hydraulic line 32. Wheel-associated, hydraulic service brake system 34 is further connected to selector valve 16 through the combination of hydraulic lines 20 and 26. The selector valve 16 is operatively connected to a hydraulic oil supply 10, such as the hydraulic system of a prime mover (not shown), by hydraulic supply lines 12 and 14. Examples of prime movers include, but are not limited to, tractors, trucks, and automobiles. Valves 28, 29, and 30 control the flow of hydraulic fluid through the hydraulic lines in such as manner so that when valves 28 and 29 are open, valve 30 is closed; and when valves 28 and 29 are closed, valve 30 is open. Step down regulator 27 controls the pressure of the hydraulic fluid passing through hydraulic line 26 to the wheel-associated, hydraulic service brake system 34.

Although not illustrated, the hydraulic system 100 may also be used to operate multiple, other single or double acting hydraulic cylinders. Such additional cylinders may include for example, but not limited to, cylinders for raising or lowering a scraper bucket, opening or closing a scraper apron, operating a load ejector, or raising a dump bed.

During normal operation, while valves 28 and 29 remain open and valve 30 remains closed, hydraulic system 100 allows the operator to control freely the action of load-bearing hydraulic cylinder 22. However, the hydraulic pressure of hydraulic system 100 may be modulated to activate the braking system of hydraulic system 100 or used for another purpose if the operator desires. To modulate the hydraulic pressure to activate wheel-associated, hydraulic service brake system 34, the operator causes valves 28 and 29 to close and valve 30 to open. As a result, the force of gravity acting on the imposed weight and indicated by arrow 24 acts to create gravity-generated hydraulic pressure within load-bearing hydraulic cylinder 22, as the piston rod is pushed back into the sleeve by the force of gravity acting on the suspended load, pressurizing the hydraulic fluid contained therein. Pressurized hydraulic fluid is then provided through hydraulic lines 20 and 26 to the wheel-associated, hydraulic service brake system 34. Step down regulator 27 is used control the pressure of the hydraulic fluid through line 26 to wheel-associated, hydraulic service brake system 34 so that the pressure does not injure the wheel-associated, hydraulic service brake system 34. The hydraulic pressure so provided then actuates wheel-associated, hydraulic service brake system 34 to arrest the movement of the vehicle on which hydraulic system 100 is mounted by, for example stopping or retarding the rotation of the ground engaging wheels of the vehicle. Thus, a scraper, dump truck, or other load-carrying vehicle can continue to provide a source of hydraulic pressure to the brake upon failure of other sources of hydraulic pressure.

It will be appreciated by one of skill in the art that any type of wheel-associated, hydraulic service brake system 34 may be used. Wheel-associated braking systems are generally of the type that act directly on a wheel assembly or a wheel-associated axle, drive-shaft, or drive line to slow the rotation of the wheel. Examples of wheel-associated, hydraulic braking systems include, but are not limited to, standard drum braking systems, disc braking systems, wheel-associated clutch brakes, drive line brakes, caliper brakes, and wheel-associated friction brakes. These systems may act directly or indirectly on the wheels. Non-wheel-associated brakes include, but are not limited to, drag brakes, non-wheel-associated clutch brakes, and non-wheel-associated friction brakes.

It will be further apparent to those of ordinary skill that various types of valves 28, 29, and 30 may be used. In one exemplary embodiment, valves 28, 29, and 30 may each comprise an electrically-controlled, solenoid-type valve that may be controlled by a control switch (not shown) that may be located in a cab of the prime mover (not shown) used to pull the vehicle on which hydraulic system 100 is mounted, or, if the vehicle on which hydraulic system 100 is mounted is self-propelled, the control switch (not shown) may be located in the control area of the self-propelled vehicle. In other embodiments, valves 28, 29, and 30 may be any type of hydraulic valve and controlled in any manner known in the art, such as by mechanical systems and the like. Other types of valves that may be used with the hydraulic system 100 of the present invention include, without limitation, sandwich valves, hydraulic control valves, electrohydraulic valves, remote control valves, mobile valves, directional control valves, check valves, glove valves, gate valves and other types of manual control valves. Types of control systems that may be used to control valves 28, 29, and 30 of the hydraulic system 100 of the present invention include, without limitation, pressure controlled systems, vacuum systems, electronically controlled systems, automatically controlled systems, manually controlled systems, remote control systems, and mechanically linked systems. It will be further appreciated by one of skill in the art that valves 28, 29, and 30 may be configured so as to operate from a single control or independently. Furthermore, the operation of valves 28, 29, and 30 may be controlled by an automatic system and/or actuated manually. Such control may be local (at the valve site) or remote.

As will be appreciated by one of skill in the art valves 28, 29 and 30 may be designed so as to assume a default position in the absence of electrical power or direction from the operator. For example, valves 28 and 29 may default to a closed position and valve 30 may default to an open position. Such default settings for the valves would thus provide for the default application of the service brake using the gravity-generated hydraulic pressure in the absence electricity or input from the operator. As noted above, during normal operation, the operator will cause valves 28 and 29 remain open and valve 30 remains closed. If, however, the valves become released from operator control, for example by detachment of a scraper from the prime mover, the valves will assume their default position and thus apply the service brake. Such a default arrangement may further allow the gravity-generated hydraulic pressure to provide an inexhaustible parking brake to keep any vehicle mounted with such a system from moving unintentionally. Such systems have been referred to in the art as "deadman" default systems.

Figure 2:
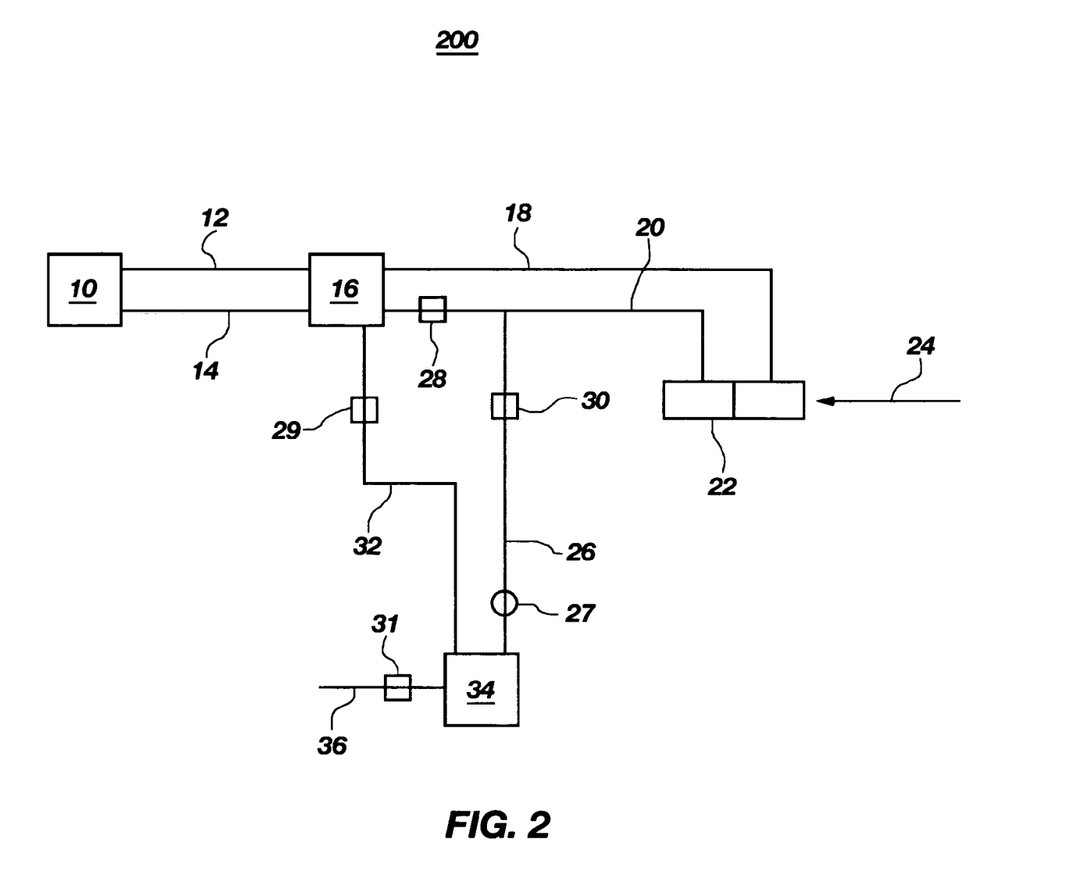
FIG. 2 is a schematic diagram of a hydraulic system used to provide hydraulic pressure to a service brake system and, upon the utilization or dissipation of that pressure, deploy a drag-brake.

Referring now to drawing FIG. 2, there is illustrated a schematic view of a hydraulic system according to the present invention generally at 200. As illustrated, the hydraulic system 200 includes valve 31 which controls the flow of hydraulic fluid through hydraulic line 36. Hydraulic line 36 releases hydraulic fluid in the wheel-associated, hydraulic service brake system 34 such that the hydraulic pressure acting on the wheel-associated, hydraulic service brake system 34 is decreased when valve 31 is open.

Although not illustrated, the hydraulic system 200 may also be used to operate multiple hydraulic cylinders which can be single or double acting. Such additional cylinders may include, for example, but are not limited to, cylinders for raising or lowering a scraper bucket, opening or closing a scraper apron, or operating a load ejector, or provide pilot pressure for other hydraulic valves. Furthermore, hydraulic system 200 and the gravity-generated hydraulic pressure made available thereby may be used for purposes other than operating a brake. Examples of other uses include, but are not limited to, operating other hydraulic cylinders or for energy storage in a hydraulic accumulator.

During normal operation, while valves 28 and 29 remain open and valves 30 and 31 remain closed, hydraulic system 200 of the present invention allows the operator to control freely the activation of the wheel-associated, hydraulic braking system and load-bearing hydraulic cylinder 22. However, if the operator desires to activate the braking system of hydraulic system 200, the operator causes valves 28 and 29 to close and valve 30 to open. As a result, the gravitational force acting on the imposed weight and indicated by arrow 24 acts to create pressure on load-bearing hydraulic cylinder 22 such that pressurized hydraulic fluid is provided through hydraulic lines 20 and 26 to the wheel-associated, hydraulic service brake system 34. Step down regulator 27 is used control the pressure of the hydraulic fluid through line 26 to hydraulic braking system 24 so that the pressure does not injure the wheel-associated, hydraulic service brake system 34. The hydraulic pressure so provided then actuates the wheel-associated, hydraulic service brake system 34 in such a manner so as to arrest the movement of the vehicle on which hydraulic system 200 is mounted by, for example, stopping or slowing the rotation of the ground engaging wheels of a scraper or a dump truck.

In addition, the operator may choose to open valve 31. When valve 31 is opened, the hydraulic pressure actuating the wheel-associated, hydraulic service brake system 34 will relieved through hydraulic line 36. As the hydraulic pressure acting on the wheel-associated, hydraulic service brake system 34 is relieved, the imposed weight supported by load-bearing hydraulic cylinder 22 will begin to descend.

When the hydraulic pressure in hydraulic line 20 becomes low enough, the imposed weight supported by load-bearing hydraulic cylinder 22 will be fully lowered. If the lowered position of the imposed weight is such that it, or a structure attached thereto, engages the ground, the imposed weight (or attached structure) may then act as drag-brake. For example, where system 200 is installed in a ground moving scraper, such as that depicted in FIG. 5 as earth moving apparatus 500, the imposed weight may be provided by the frame 60. Upon the complete lowering of the frame 60, the frame 60 will contact the ground and act as a drag brake. Thus, as would be apparent to one of skill in the art, the combination of hydraulic actuation of the service brake and the deployment of the drag brake in the manner described act as a inexhaustible source of braking.

As will be apparent to those of ordinary skill in the art, the opening of valve 31 may be modulated such that sufficient hydraulic pressure remains to activate the service brake during the period in which the imposed weight is being lowered. One non-limiting example of such a modulation is a situation wherein the amount of fluid able to pass through valve 31 is substantially less than the hydraulic fluid being input into the brake. Such a situation will create residual hydraulic pressure to operate the brake as long as the imposed weight acting on the load-bearing hydraulic cylinder 22 continues to push more hydraulic fluid from hydraulic cylinder 22 into the wheel-associated, hydraulic service brake system 34 than can relieved than can be instantly relieved through valve 31. Another operational example includes causing valve 31 to be opened and closed in a rapid manner, thus alternately applying the brake and relieving the hydraulic pressure within the brake, with the lost hydraulic fluid being replaced by the action of the imposed weight on hydraulic cylinder 22 to push hydraulic fluid through hydraulic line 20 and into the wheel-associated, hydraulic service brake system 34 until the imposed weight is fully lowered.

Generally, any type of valve 31 may be used. In one exemplary embodiment, valve 31 may comprise an electrically-controlled, solenoid-type valve that may be controlled by a control switch (not shown) that may be located in a cab of the prime mover (not shown) used to pull the vehicle on which hydraulic system 200 is mounted, or, if the vehicle on which hydraulic system 300 is mounted is self-propelled, the control switch (not shown) may be located in the control area of the self-propelled vehicle. In other embodiments, valves 31 may be any type of hydraulic valve and controlled in any manner known in the art, such as by mechanical systems and the like. Other types of valve 31 that may be used with the hydraulic system 200 of the present invention include, without limitation, sandwich valves, hydraulic control valves, electrohydraulic valves, remote control valves, mobile valves, directional control valves, check valves, glove valves, gate valves and other types of manual control valves. Types of control systems that may be used to control valve 31 of the hydraulic system 200 of the present invention include, without limitation, pressure controlled systems, vacuum systems, electronically controlled systems, automatically controlled systems, manually controlled systems, remote control systems, and mechanically linked systems. It will be further appreciated by one of skill in the art that valve 31 may be configured so as to operate from a single control or independently. Furthermore, the operation of valves 31 may be controlled by an automatic system and/or actuated manually. Such control may be local (at the valve site) or remote. As will be appreciated by one of skill in the art, valve 31 may be designed so as to assume a default position in the absence of electrical power or direction from the operator. Such a default position can be set to work in conjunction with or in opposition to default positions for valves 28, 29 and 30.

Figure 3:
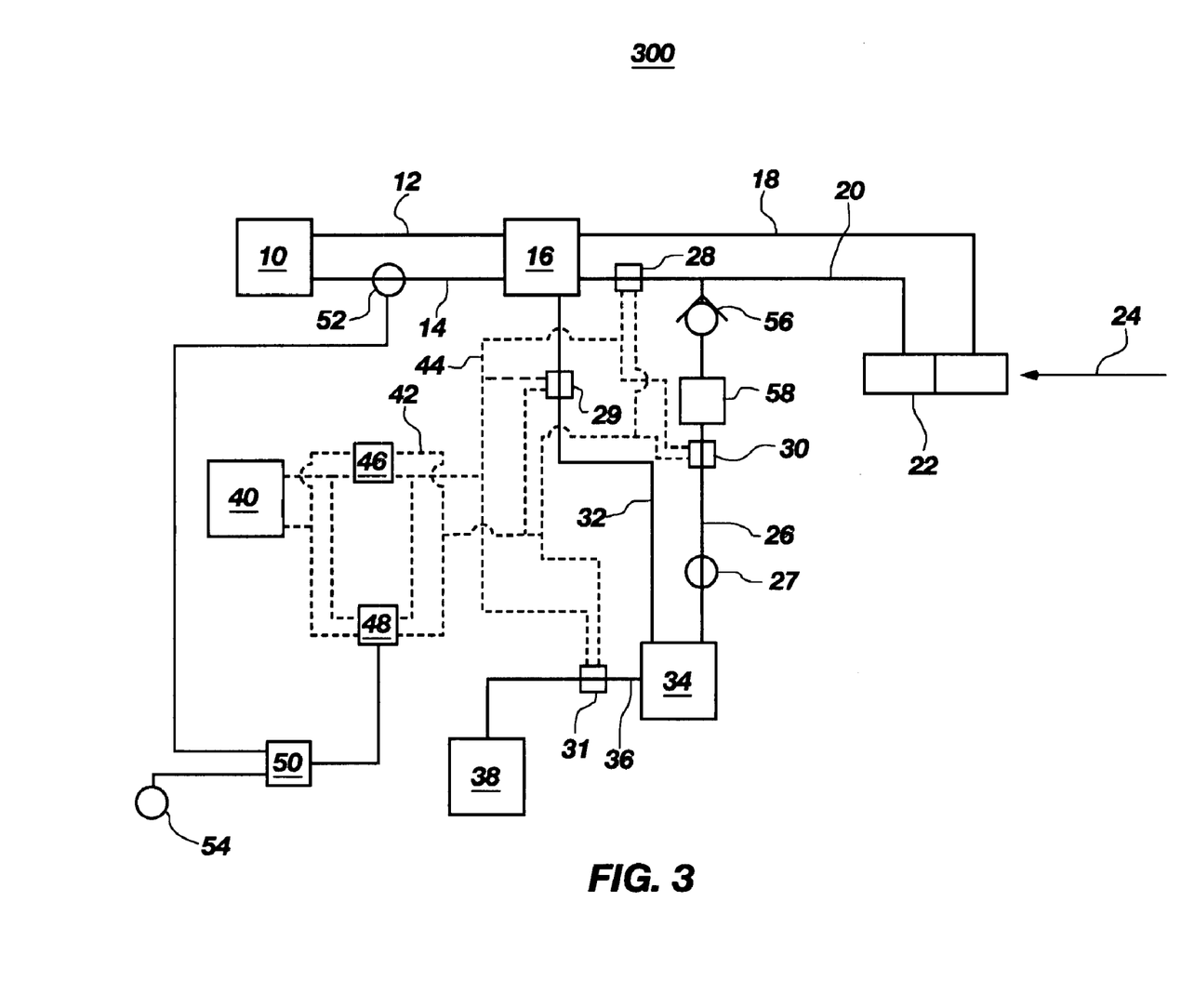
FIG. 3 illustrates one potential embodiment of a hydraulic system used to provide hydraulic pressure to a braking system and, upon the utilization or dissipation of that pressure, deploy a drag-brake.

Referring now to drawing FIG. 3, there is illustrated another exemplary embodiment of a hydraulic system according to the present invention, shown generally at 300. As illustrated, the hydraulic system 300 includes a receptacle 38 which is attached to hydraulic line 36 so as to catch any hydraulic fluid passing through hydraulic line 36. Battery 40 is operatively attached to valves 28, 29, 30, and 31 through electrical wires 42 and 44, in order to provide power to operate valves 28, 29, 30, and 31 if the primary power fails. Control switch 46 is operatively connected to electrical wires 42 and 44, such that the actuation of control switch 46 causes valves 28 and 29 to close and valves 30 and 31 to open. Control switch 46 may be located in a cab of the prime mover (not shown) used to pull the vehicle on which hydraulic system 300 is mounted, or, if the vehicle on which hydraulic system 300 is mounted is self-propelled, the control switch 46 may be located in the control area of the self-propelled vehicle. Control switch 48 is operatively connected to electrical wires 42 and 44 such that actuation of control switch 48 causes valves 28 and 29 to close and valves 30 and 31 to open. Control switch 48 is controlled by processor 50. Processor 50 may be designed to actuate control switch 48 when sensor 52 detects and signals a loss of hydraulic pressure in hydraulic line 14, which (in some embodiments) may further require that sensor 54 indicates that the vehicle on which hydraulic system 300 is mounted is in motion. Processor 50 may also be manually deactivated. If valves 28 and 29 default to a closed position and valve 30 defaults to an open position, there would be no need for battery 40 to actuate the valves in the event of a power loss. Check valve 56 regulates the passage of hydraulic fluid into hydraulic line 20. Hydraulic accumulator 58 stores hydraulic pressure passing through check valve 56.

During normal operation, while valves 28 and 29 remain open and valves 30 and 31 remain closed, hydraulic system 300 of the present invention allows the operator to control freely the activation of the wheel-associated, hydraulic service brake system 34 and load-bearing hydraulic cylinder 22. When hydraulic pressure is provided through hydraulic line 20 to actuate load-bearing hydraulic cylinder 22, hydraulic pressure will pass through check valve 56 and be stored in hydraulic accumulator 58. If the operator desires to engage the brake, he activates control switch 46 causing valves 28 and 29 to close and valves 30 and 31 to open. As a result, the accumulated hydraulic pressure in hydraulic accumulator 58 will actuate the wheel wheel-associated, hydraulic service brake system 34.

In addition, the gravitational force acting on the imposed weight and indicated by arrow 24 acts to create pressure on load-bearing hydraulic cylinder 22 such that pressurized hydraulic fluid is provided through hydraulic lines 20 and 26 so as to provide additional hydraulic pressure to hydraulic accumulator 58. The wheel-associated, hydraulic service brake system 34 is actuated in such a manner so as to arrest the movement of the vehicle on which hydraulic system 300 is mounted by, for example stopping the rotation of, for example but not limited to, the ground engaging wheels of a scraper or a dump truck.

In addition, with the opening of valve 31, the hydraulic fluid actuating on the wheel-associated, hydraulic service brake system 34 will relieved through hydraulic line 36. Besides the opening of valve 31, the hydraulic fluid may also be relieved through seepage or leaking from any one of hydraulic cylinder 22, hydraulic lines 20 and 26, step down regulator 27, valves 30 and 56, hydraulic accumulator 58, or wheel-associated, hydraulic service brake system 34. The degree to which valve 31 is opened can be modulated so as to provide for the release of hydraulic fluid such that hydraulic pressure remains available to operate the brake as long as gravity-generated hydraulic pressure is supplied into the brake through hydraulic lines 20 and 26. The hydraulic fluid escaping from hydraulic line 36 may be collected in receptacle 38 or returned to the prime mover through a low pressure hydraulic return line (not depicted). As the hydraulic fluid acting on the wheel-associated, hydraulic service brake system 34 is relieved, the imposed weight supported by load-bearing hydraulic cylinder will begin to descend. When the hydraulic pressure in hydraulic line 20 becomes low enough, the imposed weight supported by load-bearing hydraulic cylinder 22 will be fully lowered. If the lowered position of the imposed weight or a structure attached thereto is such that it engages the ground, the imposed weight or attached structure may then act as drag-brake, as previously described herein.

If the vehicle on which hydraulic system 300 is mounted is in motion as detected by sensor 54, and there is a loss of hydraulic pressure in hydraulic line 14 as detected by sensor 52, processor 50 may actuate control switch 48. Actuation of control switch 48 will cause valves 28 and 29 to close and valves 30 and 31 to open, generating the same result as the actuation of control switch 46. In an additional embodiment, the ability of processor 50 to actuate control switch 48 may be manually disabled to allow the intentional movement of the vehicle on which hydraulic system 300 is mounted in the absence of hydraulic pressure in hydraulic line 14.

Figure 4:
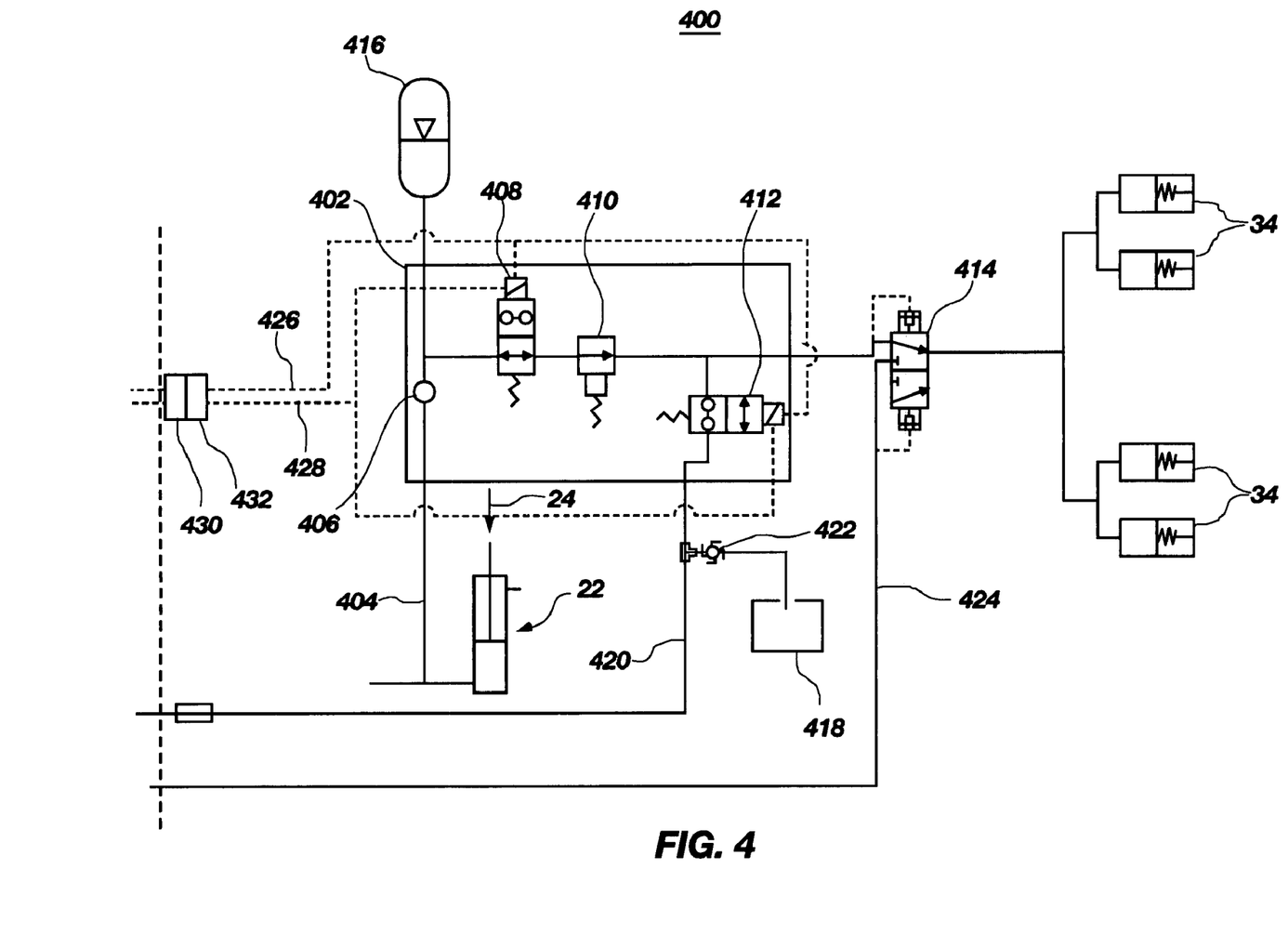
FIG. 4 illustrates a second potential embodiment of a hydraulic system used to provide hydraulic pressure to a braking system and, upon the utilization or dissipation of that pressure, deploy a drag-brake.

Referring now to drawing FIG. 4, there is illustrated another exemplary embodiment of a hydraulic system according to the present invention generally at 400. As illustrated, the hydraulic system 400 includes a load-bearing hydraulic cylinder 22 that is used, at least in part, to lift some imposed weight off the ground. Arrow 24 indicates the direction of the force of gravity acing on the imposed weight supported on the load bearing hydraulic cylinder 22. The load-bearing hydraulic cylinder 22 is operatively connected to manifold block 402 through hydraulic line 404. Manifold block 402 comprises check valve 406, 2-way solenoid valves 408 and 412, as well as pressure reducing valve 410. Valve 408, in the absence of electricity or input from the operator defaults to an open position allowing hydraulic pressure to pass from load-bearing hydraulic cylinder 22, through hydraulic line 404 and manifold 402 to wheel-associated, hydraulic service brake system 34.

Optionally, an selector valve assembly 414 may be interposed between manifold 412 and wheel-associated, hydraulic service brake system 34. Manifold 402 is also connected to hydraulic accumulator 416. Hydraulic line 420 further connects manifold 402, through relief valve 422, to overflow bottle 418. Hydraulic line 420 may be further connected to the low pressure hydraulic return of the prime mover. Optional selector valve assembly 414 may be connected to the brake controller of the prime mover via hydraulic line 424. Electrical lines 426 and 428 connect manifold 402 to the power supply from the prime mover via plug 430 and socket 432.

During normal operation, valve 408 remains closed and excess hydraulic pressure bleeds through check valve 406 to be stored in hydraulic accumulator 416. If hydraulic valve 408 is opened through operator action or loss of electrical power, hydraulic pressure would pass through valve 408 and pressure reducing valve 410 to activate wheel-associated, hydraulic service brake system 34. If hydraulic valve 412 is opened through operator action or loss of electrical power, the hydraulic fluid passing through pressure reducing valve 410 may further pass through relief valve 422 to be collected in overflow bottle 418 or returned to the prime mover via the low pressure hydraulic return line. Furthermore, during normal operation, the operator may actuate the wheel-associated, hydraulic service brake system 34 by providing hydraulic pressure from the braking system of the prime mover via hydraulic line 424. Optional selector valve assembly 414 allows both hydraulic pressure from hydraulic line 424 and from manifold 402 to operate wheel-associated, hydraulic service brake system 34 independently.

Figure 5:
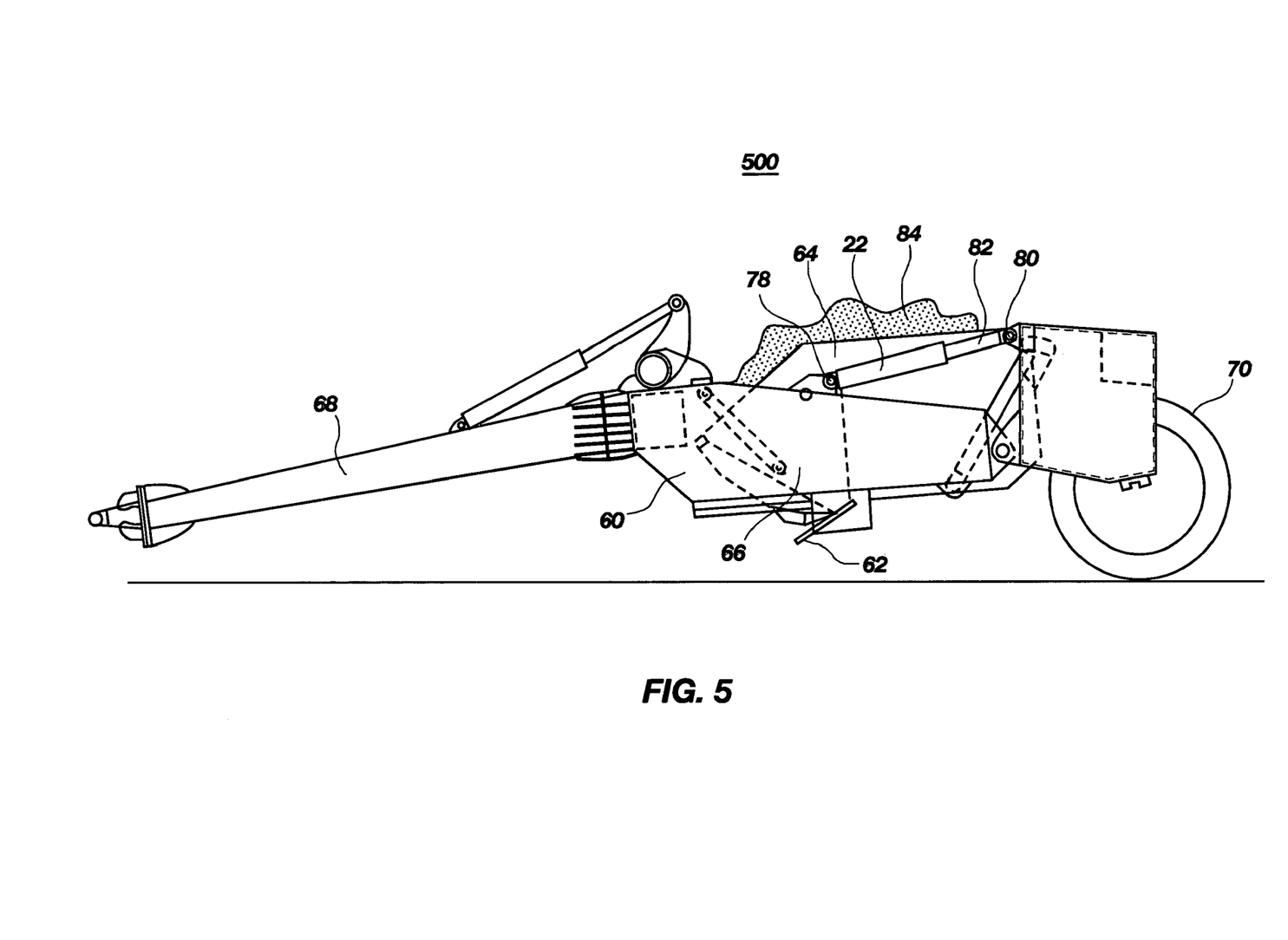
FIG. 5 illustrates a scraper on which the hydraulic system of the present invention may be incorporated.

Referring now to drawing FIG. 5, there is shown a side view of an earth moving apparatus 500. Scrapers and earthmoving apparatuses of the general type to which earth moving apparatus 500 relates are generally known. Representative examples of earthmoving scrapers include, without limitation, the scrapers disclosed in U.S. Pat. Nos. 4,383,380, 4,388,769, 4,398,363, 4,553,608, and 6,347,670 to Miskin, the disclosures of which are herein incorporated by reference. A typical scraper includes a bucket for holding earth. The bucket includes a floor, a rear wall, two upstanding opposing side walls, an open front and an open top. An apron, or gate, is located opposite the rear wall of the bucket and can swing closed to hold the soil in the bucket during transport. A blade is located adjacent the front edge of the floor of the bucket and cuts the earth to a predetermined depth as the earth moving apparatus is moved forward over the earth's surface. The soil cut from the earth by the blade is collected in the bucket, as depicted at reference numeral 84. When the bucket is full of soil, the scraper is transported to another location where the soil is deposited.

More specifically, the depicted exemplary earth moving apparatus 500 includes a frame 60, a cutting blade 62, a bucket 64, an apron 66, a tongue 68 and at least two ground engaging wheels 70. An actuator, such as a load-bearing hydraulic cylinder 22 has a first end 78 and a second end 80. When a piston rod 82 of the load-bearing hydraulic cylinder 22 is extended (as shown), the frame 60 is effectively raised. The imposed weight of frame 60 thus applies pressure upon load-bearing hydraulic cylinder 22. According the present invention, the pressure upon load-bearing hydraulic cylinder 22 may be used to actuate the wheel-associated, hydraulic service brake system 34 (not shown). Furthermore, the pressure upon load-bearing hydraulic cylinder 22 may be released or utilized such that load-bearing hydraulic cylinder 22 can no longer support the imposed weight of frame 60. When the imposed weight can no longer be supported, frame 60 engages the ground in such a manner so as to act as a drag-brake.

It will be appreciated by those of ordinary skill in the art that the embodiments described herein are not intended to limit the scope of the present invention. Various combinations and modifications of the embodiments described herein may be made without departing from the scope of the present invention and all modifications are meant to be included within the scope of the present invention. Thus, while certain exemplary embodiments and details have been described for purposes of describing the invention, it will be apparent to those of ordinary skill in the art that various changes in the invention described herein may be made without departing from the scope of the present invention, which is defined in the appended claims.

What is claimed is:

1. A method of operating a brake on an earth moving apparatus, the method comprising:

imposing a weight upon a piston of a hydraulic cylinder of an earth moving apparatus by lifting a weight of the earth moving apparatus comprising a bucket for retaining soil by means of said hydraulic cylinder to place a force on the hydraulic fluid within said cylinder, the weight further comprising a drag-brake mechanism;

compressing said fluid within said hydraulic cylinder using the force of gravity acting on said weight to generate a pressurized hydraulic fluid;

directing said pressurized hydraulic fluid to operate a hydraulic brake system by bleeding out at least a portion of the pressurized hydraulic fluid to move the drag brake into operative contact with a ground surface.

2. The method of claim 1, wherein imposing the weight upon said piston of said hydraulic cylinder of the earth moving apparatus by lifting the weight of the earth moving apparatus comprising the bucket for retaining soil to a suspended position by means of said hydraulic cylinder of an earth moving apparatus to place a force on the hydraulic fluid within said cylinder comprises lifting a variable weight comprising the bucket for retaining soil and any soil retained therein.

3. The method of claim 1, wherein operating a brake system on said earth moving apparatus using said generated hydraulic pressure comprises operating the hydraulic braking system to slow the rotation of a wheel on said earth moving apparatus.

4. The method of claim 3, wherein operating the hydraulic braking system to slow the rotation of a wheel on said earth moving apparatus comprises operating a brake system selected from the group consisting of drum braking systems, disc braking systems, drive line braking systems, clutch braking systems, and friction braking systems.

5. A hydraulic system for operating a brake, comprising:

a hydraulic cylinder that generates hydraulic pressure from a weight comprising a bucket for retaining soil of an earth moving apparatus suspended thereon by lifting said weight to a suspended position by means of said hydraulic cylinder, wherein the weight lifted to the suspended position by means of the hydraulic cylinder comprises a ground-engaging ground brake; and a hydraulic braking system operatively linked to the hydraulic cylinder, the hydraulic braking system actuatable by hydraulic pressure generated by the hydraulic cylinder.

6. The hydraulic system of claim 5, further comprising a step-down regulator to control the level of hydraulic pressure reaching the brake.

7. The hydraulic system of claim 5, further comprising one or more valves allowing an operator to modulate the flow of hydraulic pressure from the hydraulic cylinder to the brake or to divert it to some other useful function and wherein the hydraulic pressure supplies pilot pressure to operate the valves if necessary.

8. The hydraulic system of claim 7, further comprising an automatic system to actuate the one or more valves.

9. The hydraulic system of claim 8, further comprising a back up electrical system capable of actuating the valves.

10. The hydraulic system of claim 8, wherein the valves assume a default position in the absence of electrical power.

11. The hydraulic system of claim 5, wherein the hydraulic braking system which is actuated by hydraulic pressure operatively linked to the hydraulic cylinder comprises the hydraulic braking system selected from the group consisting of drum braking systems, disc braking systems, clutch braking systems, drive line braking systems, and friction braking systems.

12. An earth moving apparatus comprising:
   a gravity-actuable, load-bearing piston within a hydraulic cylinder containing a hydraulic fluid, the piston being load-bearing from lifting an imposed weight comprising a bucket of the earth moving apparatus to a suspended position by means of said hydraulic cylinder;
   a means to release said load bearing piston whereby gravity moves said piston to compress the hydraulic fluid within said cylinder; and
   a hydraulic braking system operatively linked to the load-bearing hydraulic cylinder, the hydraulic braking system actuatable by hydraulic pressure generated by the load-bearing hydraulic cylinder and comprising a ground-engaging ground brake suspended from the load-bearing cylinder, such that hydraulic pressure is generated in the load-bearing hydraulic cylinder from suspension of the ground-engaging drag-brake.

13. The earth moving apparatus of claim 12, further comprising a valve allowing an operator to modulate the hydraulic pressure from the load-bearing hydraulic cylinder to actuate the hydraulic braking system or to divert it to some other useful function.

14. The earth moving apparatus of claim 12, wherein the hydraulic braking system is actuatable by hydraulic pressure generated by the load-bearing hydraulic cylinder by bleeding hydraulic pressure from the load-bearing cylinder to move the ground-engaging drag brake into operative contact with a ground surface.

15. The earth moving apparatus of claim 12, wherein the hydraulic braking system operatively linked to the load-bearing hydraulic cylinder comprises the hydraulic braking system for slowing the rotation of a wheel on the earth moving apparatus.

16. The earth moving apparatus of claim 15, wherein the hydraulic braking system for slowing the rotation of a wheel on the earth moving apparatus is selected from the group consisting of drum braking systems, disc braking systems, drive line braking systems, clutch braking systems, and friction braking systems.

* * * * *